been understood for many years that the hydraulics or hydrodynamics is against this; and that even in the absence of any "consumption" of glass at the orifices, there is a great circulating current, forward from the melting end to the refining end in the surface layers of the glass and in the upper part of the throat, then back again from the refining end to the melting end in the lower parts of the tank and throat. It is also understood that even when there is a consumption of glass at the orifices, the reverse current tends to persist. Thus, prior art tanks of the type described above are designed under an old misapprehension, and the cooling off of the glass is continually frustrated by bringing it back time and again into the melting end. This circulation no doubt has some advantages in that it prevents the throat from "freezing up" when consumption is low and possibly helps to homogenize the glass at times. On the other hand, it may also do the reverse, continually contaminating refined glass with seedy glass, and causing exceptional erosion of the throat, the most vulnerable area of the whole tank. The erosion products tend to produce "cords" and "stones," while the erosion itself may wear out the throat and cause the collapse of the whole tank. The reason for circulating current is well understood, and its reality not disputed; however no satisfactory means has heretofore been proposed for eliminating the problem of erosion and seedy glass in the refining end of prior art furnaces.

United States Patent Office 3,583,861
Patented June 8, 1971

3,583,861
METHOD AND APPARATUS FOR REFINING FUSIBLE MATERIAL
Frank W. Preston, Butler, Pa., assignor to Corning Glass Works, Corning, N.Y.
Continuation of application Ser. No. 438,914, Mar. 11, 1965, which is a continuation of application Ser. No. 136,365, Sept. 6, 1961, both now abandoned. This application Apr. 8, 1968, Ser. No. 725,557
Int. Cl. C03b 5/02
U.S. Cl. 65—135    3 Claims

ABSTRACT OF THE DISCLOSURE

Described is a method and apparatus for melting and refining fusible material wherein coarse-grained homogeneity is effected in the upper portion of a melting furnace under conditions of turbulent circulation, while fine-grained homogeneity or molecular diffusion is effected in the lower portion of the vessel under streamlined non-turbulent conditions, the refined glass being withdrawn from said lower portion.

CROSS-REFERENCES TO RELATED APPLICATIONS

Figure 1:
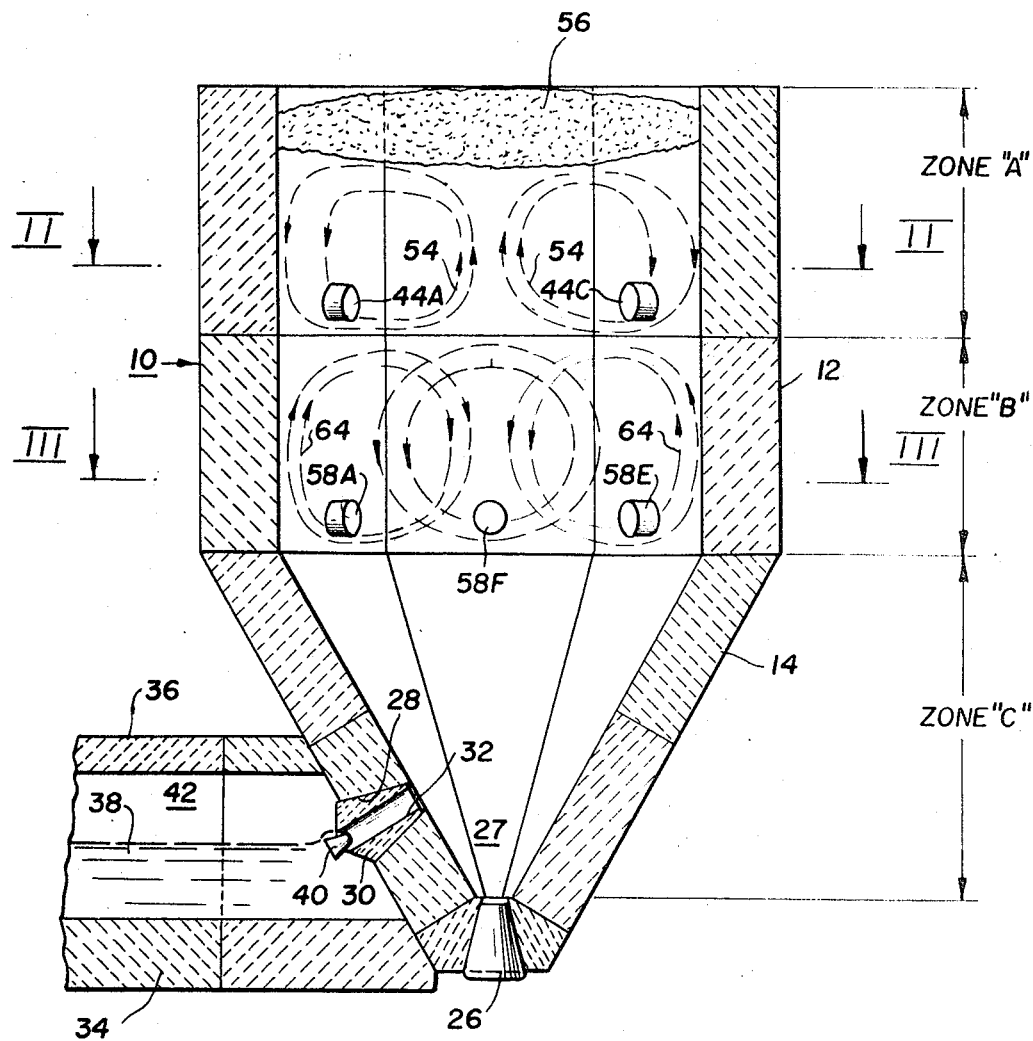

This application is a continuation of copending application Ser. No. 438,914, filed Mar. 11, 1965, which application is a continuation of application Ser. No. 136,365, filed Sept. 6, 1961 both now abandoned.

BACKGROUND OF THE INVENTION

Although not necessarily limited thereto, the present invention is particularly adapted for use in melting and refining glass. At the present time glass, when produced in quantity, is most often melted in a Siemens type regenerative furnace fired with oil, natural gas, artificial gas, or other liquid or gaseous fuel. The glass is contained in a "tank," which is usually a rectangular bath of refractory material typically three and one-half feet deep; and the fire is contained in a "gas space" above the tank, this gas space comprising a similar rectangular chamber made usually of silica brick which fits over the tank proper but is supported on steelwork independently thereof, so that the one may be repaired independently of the other.

The material fed to the tank is called "batch" which is the heterogeneous mixture of raw substances which when degassed and fused together make the glass; and this batch commonly contains a modest amount of "cullet," which is glass that has been melted before and is now being used over again. Most of the batch materials are granular or in the form of fine powder, however, the cullet is frequently in larger pieces.

The tank consists most often of two sections placed end-to-end. One section is called the "melting end," and the other the "refining end." The connection between the two ends is either through a short tunnel called the "throat," or under one or more pairs of "floaters" which are clay structures that float nearly flush with the glass surface but prevent surface scum from entering the refining end. Floaters act in a sense to create a throat as wide as the tank; while tunnel throats are much narrower, a small fraction of the tank width. The fire is normally confined to the melting end, while the function of the refining end is less to refine (i.e., get rid of fine bubbles or "seed") than it is to drop the temperature to what is needed for "working" the glass. Hence, the refining end is sometimes known as the "working end." In any case, the temperature of the refining end is usually several hundred Fahrenheit degrees less than that of the melting end.

It was originally supposed that the glass progressed smoothly from the melting end to the refining end and thence to the working or exit orifices; but it has been

SUMMARY OF THE INVENTION

As an overall object, the present invention seeks to provide a new and improved method and apparatus for melting and refining fusible materials such as glass which overcome the above and other disadvantages of prior art melting furnaces.

More specifically, an object of the invention is to provide a method and apparatus for melting and refining fusible materials wherein the circulating currents between the refining and melting ends of prior art furnaces are eliminated to preclude the contamination of refined glass with seedy glass.

Another object of the invention is to provide a melting furnace for fusible materials such as glass in which the refining zone of the furnace is beneath the melting zone such that the batch may be melted under turbulent conditions in the upper zone while the fused material, being heavier, flows downwardly to the lower zone where diffusion may effect fine-grained homogeneity under streamlined non-turbulent conditions.

In accordance with the embodiment of the invention described herein, there is provided a vessel of circular or hexagonal horizontal cross section which may, for example, have a diameter of about six feet and a depth of seven or eight feet. The walls of the vessel are lined with refractory material, and the bottom of the vessel is preferably funnel-shaped or conical. Batch is fed in at the top of the vessel and covers the molten glass or other fusible material completely. Circumferentially spaced around the sides of the vessel intermediate its top and bottom are heavy electrodes for three-phase current. These electrodes comprise the heating elements for the furnace, using electricity for fuel. The power introduced through the electrodes tends to produce localized heat at the center of the tank intermediate its ends to create circulating convection currents, in the upper half of the tank, the glass rising in the center and descending towards the periphery of the tank. The lower half of the tank, however, tends to be substantially free of such currents, and the glass therein to be stratified. This glass, being cooler than the rest, does not circulate back into the upper parts, and can rid itself once and for all of its seeds. Heavy trash, such as pieces of iron, can settle down into the conical base where a withdrawal plug may permit the removal thereof intermittently. The consumption or withdrawal current comes from an orifice, or orifices, in the side of the funnel-shaped bottom. If desired, a gas space, similar to the gas space of a conventional Siemens type furnace, may be provided at the top of the vessel above the batch and a gaseous fuel used to heat the batch in combination with the electric current, or even without it if this appears to be economical or otherwise desirable.

With the arrangement just described, the plane of separation between the melting and refining ends or zones of the vessel is horizontal, not vertical as in prior art melting furnaces, and the refining zone is below the melting zone. This separation between the upper and lower melting and refining zones can be compared with a thermocline in limnology. Under these conditions, neither the throat nor floaters are necessary since, because the cooler glass is the more dense, it naturally flows downwardly and stratifies itself in this way; and, provided that heat is not supplied below the level of the top of the refining zone, the stratification in the refiner is stable to permit fine-grained homogeneity to take place.

Figure 2:
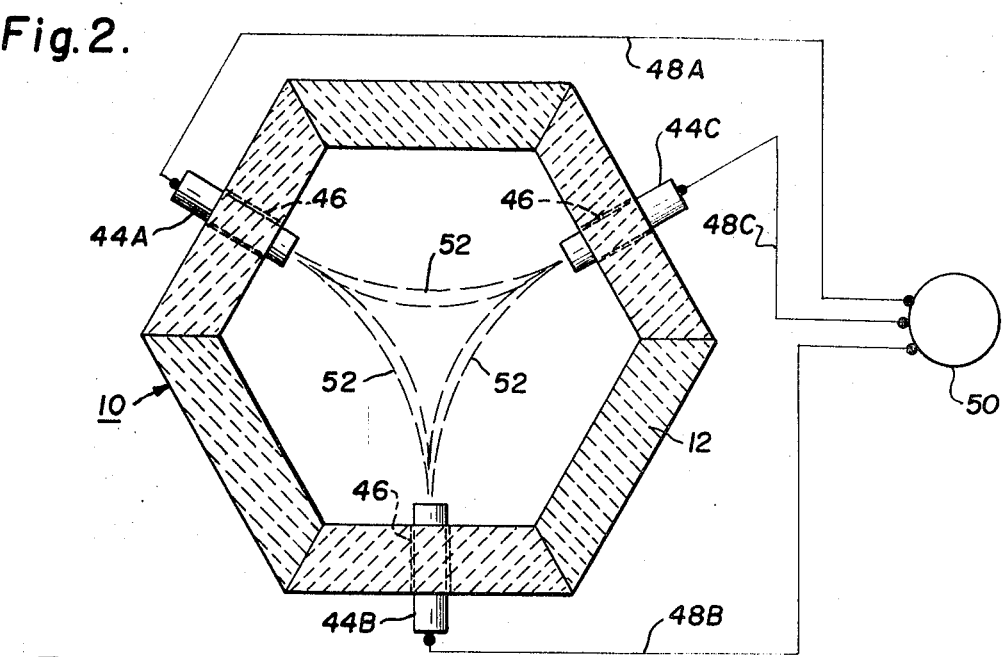
Figure 3:
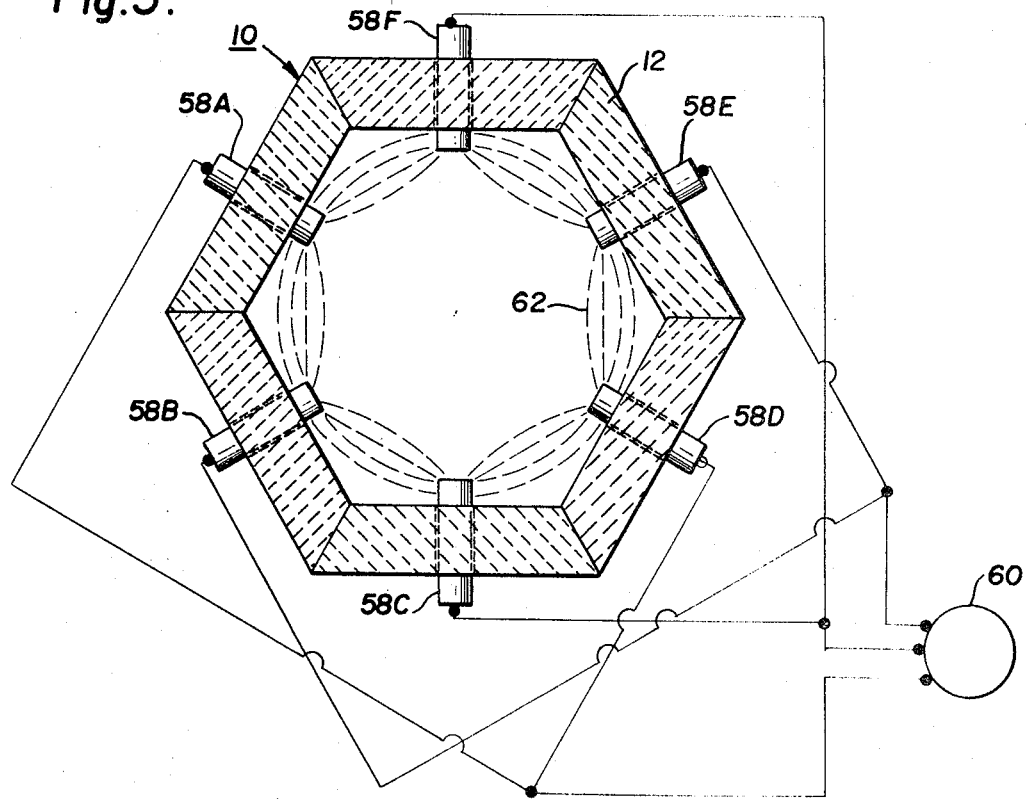

The above and other objects and features of the invention will become apparent from the following detailed description taken in connection with the accompanying drawings which form a part of this specification, and in which:

FIG. 1 is a vertical cross-sectional view of the new and improved melting and refining furnace of the invention;

FIG. 2 is a cross-sectional view taken along line II—II of FIG. 1 illustrating the arrangement of the electrodes circumferentially spaced around the periphery of the furnace for the purpose of concentrating heat at the center thereof to produce a substantial and turbulent circulation of the glass in the upper zone of the furnace; and FIG. 3 is a cross-sectional view taken along line III—III of FIG. 1 illustrating the location of a second set of circumferentially arranged electrodes designed to create currents which oppose the currents induced by the electrodes shown in FIG. 2, thereby nullifying any attempt of the melt to continue the top zone circulation down into the middle and bottom zones of the furnace.

Referring now to the drawings, the furnace shown comprises a vertical tank 10 having walls 12 of refractory material. In the embodiment shown herein there are six such walls arranged in a hexagonal configuration, however any essentially circular cross section may be used to suit requirements. Beneath the walls 12 is a funnel-shaped bottom 14 which, in the present instance, comprises an inverted hexagonal pyramid. The structural steelwork surrounding the furnace 10 for keeping the various parts in place is not shown, since the use of such steelwork is conventional in existing furnaces. Similarly, ducts for cooling air and other conventional elements are omitted to make the drawings simpler and the essential parts better understood.

At the vertex of the funnel-shaped bottom 14 is a plug 26 which may be removed or lowered to drain from the furnace foreign material such as bottle caps, tramp iron or glass heavily contaminated with refractories. As will be understood, the foreign material, being heavier than the molten glass in the furnace, falls into a well 27 at the lowest point of the funnel-shaped bottom 14 where it may be drained through plug 26. The consumption current from the furnace is drawn from an opening 28 in the side of the funnel-shaped bottom 14 somewhat above the well 27. Here a tapered plug 30 with a more or less cylindrical hole 32 through it is inserted into opening 28 and held in place against the pressure of the glass in the furnace by any suitable means such as "fingers," not shown. The function of the plug 30 is to concentrate the wear or erosion of the issuing glass stream on a readily replaceable part. From the plug 30 the issuing glass stream is directed into a flow channel 34 provided with a cover block 36. As the glass flows into the channel 34 it will form a stream 38 which "backs up" against the opening 32 in plug 30. Positioned in the end of opening 32 is a second plug 40 which is similar in shape to the plug 26 at the bottom of the furnace. This plug may be adjusted inwardly or outwardly by means, not shown, to provide a variable discharge orifice for the fused material. Above the stream 38 is a gas space 42 where additional heat may be supplied in accordance with existing practice to "condition" the glass, depending upon requirements.

Although only one plug 30 is shown herein, a plurality of such plugs may be circumferentially spaced around the sides of the funnel-shaped bottom 14, with each of these plugs leading to a flow channel similar to flow channel 34. From the flow channel 34 the glass will be conveyed to glass forming machines; and assuming that a plurality of such channels 34 are circumferentially spaced around the furnace, the furnace will be positioned at the center of a circular configuration of such forming machines, with a separate channel 34 leading to each machine. If it is desired to make cullet, the flow channel 34 may be dispensed with and the glass allowed to flow down a steeply inclined metal channel in the open and fed with a stream of water to cool the glass and break it into fragments as it proceeds down the channel.

The melting and refining of the fusible material within tank 10 progresses in three vertical zones identified as zone A, zone B and zone C. With reference to FIG. 2, it will be noted that spaced around the bottom of zone A are three electrodes 44A, 44B and 44C. Each electrode extends through an opening 46 in the furnace wall 12 and may be formed from molybdenum or other similar material. In the embodiment of the invention shown herein, the electrodes 44A–44C are connected to the three phases or leads 48A, 48B and 48C of a source of three-phase power 50. As is well known, the fused glass within the furnace 10 is an ionic conductor of electricity, and since the shortest current paths 52 between adjacent electrodes 44A–44C is through the center of the furnace as shown in FIG. 2, a localized heat zone will be generated at the center of the tank intermediate the top and bottom thereof (i.e., at the bottom of zone A). This will cause an active or turbulent circulation of the glass in zone A as indicated by the dotted line paths 54 of FIG. 1. Thus, the glass circulates upwardly near the center of the furnace, outwardly near the top of the furnace, downwardly near the walls and inwardly near the level of the electrodes 44A–44C. The furnace is fed with cullet or batch, or a mixture of the two, and forms a thick blanket 56 on top of the molten glass and prevents the escape of heat, though it is porous to carbon dioxide and other gases released in the gas melting process. If cullet alone is used, the gases released are simply air and water. As will be understood, the batch or cullet by itself is not a conductor of electricity; and, therefore, in order to initiate the currents between electrodes 44A–44C, the furnace must be initially primed with molten glass or other similar fused material. Alternatively, the furnace could be primed with batch and cullet in granular form together with salt water or some other electrolyte which initially will cause current to flow between the electrodes 44A–44C to generate heat which will start the fusion process.

Since the walls of the furnace are relatively cold, there is sometimes a tendency for the descending current of glass or other fusible material to continue down the walls from zone A to a greater distance than is desired. Therefore, if necessary, a second electrical power input may be provided in the lower portion of zone B through electrodes 58A–58F. As shown in FIG. 3, alternate ones of the electrodes 58A–58F are connected to the three output leads of a source of three-phase current 60 which may, in actual practice, be the same source as source 50 shown in FIG. 2. With the arrangement shown, the current will flow in the molten glass or other fusible material between successive electrodes in a peripheral path indicated by the dotted lines 62 of FIG. 3. In this manner, the mass is heated predominantly near the walls and a circulation indicated by the dotted lines 64 in FIG. 1 is produced, this circulation being opposite in sense to the circulation in the uppermost part of the furnace (i.e., the turbulent circulation in zone A). This tends to "wipe off" the descending currents along the walls and return it to the interior of the melt.

In zone C, fine-grained homogeneity and molecular diffusion takes place. In this zone there are no currents by virtue of the fact that the currents produced by electrodes 58A–58F oppose those produced by electrodes 44A–44C. Consequently, the glass or other fusible material in zone C is stratified, the turbulence is at a minimum, and any flow is essentially streamlined.

In the operation of the apparatus, a batch of granular or powdered material is supplied to the furnace from above and forms the blanket 56 on top of the molten material beneath. The electrical currents between the electrodes 44A–44C generate localized heat at the center of the furnace and at the bottom of zone A to produce the actively circulating currents 54 in zone A such as to mix the blanket 56 of granular material with the molten material and effect coarse-grained homogeneity of the melt. The fused or melted material, being heavier than the granular material of the batch, will naturally flow downwardly into zone B where the counter-circulatory currents 64 produced by electrodes 58A–58F oppose any tendency of the circulating currents in zone A to extend down into zone C. In zone C, the glass or other fusible material is stratified since none of the circulating currents in the upper part of the furnace will extend down into this zone. In zone C, "seeds" or bubbles are eliminated from the fused material and the final refining takes place by the molecular diffusion, mentioned above, wherein cords (i.e., small localized areas of heterogeneity) are eliminated. Any rubbish, such as tramp iron, will fall through the molten material into well 27 where it may be removed through plug 26.

The present invention thus provides a technique for melting and refining fusible material such as glass in a vertical tank wherein the glass flow is downwards and heat is applied intermediate the top and bottom of the tank. In this manner, turbulence of mixing by convection currents is induced in the volume above the heat, while below the heat there is diffusion to some extent, stratification, increasing coolness as the glass descends, and a tendency for gases to disengage themselves from the lower volume and float up to the turbulent zone.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that a dome or the like of refractory material could be supported on top of the walls 12 to provide a gas space, similar to the gas space of conventional furnaces, where gaseous fuel could be burned to assist in melting the batch.

I claim as my invention:

1. A method for melting and refining fusible material in a vessel to produce a homogeneous composition which comprises the steps of initially heating and fusing the material by inducing electrical heating currents in the top portion of the vessel, thereafter continuing the fusion in the intermediate portion of the vessel by inducing electrical heating currents causing a counter-circulation opposed to the circulation at the top of the furnace that nullifies any attempt of the material to continue the top portion circulation down into the intermediate portion, and finally effecting completion of the refining in the lowermost portion of the vessel by radiant heat penetration from the hotter portions above.

2. A furnace for melting and refining fusible material comprising a vertical tank adapted to receive a batch to be melted at the upper end thereof, means for withdrawing melted material at the bottom of said furnace, three electrodes circumferentially spaced around the periphery of said furnace intermediate the ends thereof, means for connecting the three phases of a three-phase alternating current source to the respective electrodes whereby the currents between the electrodes will be concentrated at the center of said furnace to create a turbulent circulation in the upper portion of the furnace, a set of six electrodes circumferentially and evenly spaced around said furnace beneath said first-mentioned three electrodes, and means for connecting the three-phases of a three-phase alternating current source to the respective oppositely-disposed sets of electrodes in said set of six electrodes to create a current pattern producing a circulation which opposes the circulation produced by said first-mentioned electrodes to nullify any attempt of the melt to continue turbulent circulation beneath said set of six electrodes.

3. A method for melting and refining fusible material in a vessel to produce a homogeneous composition, which comprises applying to three circumferentially spaced electrodes extending through the walls of said vessel at the top portion thereof the respective three phases of a three-phase alternating current source to thereby induce circulating electrical heating currents in said top portion which generate heat localized at the center of the vessel, the circulating electrical heating currents in the top portion of the vessel causing a mixture of melted and unmelted fusible material to circulate upwardly from the position of localized heat, then radially outwardly, then downwardly along the walls of the vessel at said top portion thereof and then radially inwardly toward the location of localized heat at the center of the vessel, causing the heavier and completely fused material to flow downwardly in the vessel from the top portion to an intermediate portion thereof, applying the three phases of a three-phase alternating current source to the respective oppositely-disposed electrodes of a set of six circumferentially and equally spaced electrodes extending through the walls of said vessel at the intermediate portion thereof to generate heat and create a counter-circulation in said intermediate portion adjacent the walls of the vessel, the counter-circulation opposing the circulation at the top portion of the vessel to nullify any attempt of the material to continue the top portion circulation down into the intermediate portion, and finally completing the refining in the lowermost portion of the vessel beneath said intermediate portion by radiant heat penetration from the hotter portions above.

References Cited

UNITED STATES PATENTS 1,905,534    4/1933    Wadman _____ 13—6

FOREIGN PATENTS 736,937    7/1943    Germany _____ 13—6

ARTHUR D. KELLOGG, Primary Examiner

U.S. Cl. X.R.

65—129, 136, 168, 347; 13—6